United States Patent

Yamaya et al.

[11] Patent Number: 5,814,703
[45] Date of Patent: Sep. 29, 1998

[54] COATING COMPOSITION

[75] Inventors: Masaaki Yamaya, Takasaki; Masahiro Yoshizawa, Annaka, both of Japan

[73] Assignee: Shin-Etsu Chemical Co., Ltd., Tokyo, Japan

[21] Appl. No.: 698,842

[22] Filed: Aug. 16, 1996

[30] Foreign Application Priority Data

Aug. 17, 1995 [JP] Japan .................................. 7-232030

[51] Int. Cl.⁶ ............................ C08L 83/04; C08L 33/04; C08L 63/00; C08L 67/00
[52] U.S. Cl. ....................... 525/103; 525/100; 525/104; 525/446; 525/476; 525/477
[58] Field of Search ..................... 525/100, 477, 525/103, 104, 446, 476

[56] References Cited

U.S. PATENT DOCUMENTS

| | | | |
|---|---|---|---|
| 3,203,919 | 8/1965 | Brachman | 525/100 |
| 3,632,715 | 1/1972 | Gowdy et al. | 525/100 |
| 4,962,156 | 10/1990 | Shinjo et al. | 525/100 |
| 5,066,720 | 11/1991 | Ohsugi | 525/100 |
| 5,393,817 | 2/1995 | Deckers et al. | 524/269 |
| 5,464,901 | 11/1995 | Yoshikawa et al. | 525/103 |

FOREIGN PATENT DOCUMENTS 0 616 011 A2  9/1994  European Pat. Off. ........ C08L 83/06

OTHER PUBLICATIONS

Derwent Pubications Ltd. AN 95–019467 Abstract.
Derwent Publications Ltd. AN 80–44340C Abstract.

*Primary Examiner*—Patricia A. Short
*Attorney, Agent, or Firm*—Pillsbury Madison & Sutro LLP

[57] ABSTRACT

A coating agent composition comprising:
(A) an organic resin, and
(B) a silicone compound represented by the average composition formula (1):

$$(X)_a(Y')_b(R^1)_c SiO_{(4-a-b-c)/2} \qquad (1)$$

wherein X is a particular functional group containing organic group, Y' is a hydrolyzable group or an admixture of a hydrolyzable group and the silanol group, $R^1$ is a monovalent hydrocarbon group, a ranges from 0.05 to 0.90, b 0.12 to 1.88, and c 0.10 to 1.00, a+b+c being in the range of 2.02 to 2.67. The amount of the silicon atoms to which said functional group-containing organic group x is bonded is 5 to 90 mol % based on the entire silicon atoms, and the amount of the T unit of $R^1$—$SiO_{3/2}$ is 10 to 95 mole % based on the entire siloxane units. This composition is useful to form a coating film excellent in weathering resistance, adhesion, stain resistance, scuffing resistance, water resistance and chemical resistance and therefore suitable for protection of articles exposed outdoors.

13 Claims, No Drawings

COATING COMPOSITION

BACKGROUND OF THE INVENTION

1. Field of the Invention

The present invention relates to a coating material composition useful for protecting the surface of articles which are directly exposed to the atmosphere or used outdoors, such as buildings, structures, automobiles or the like.

2. Description of the Prior Art

Heretofore, a variety of painting materials for outdoor use having good weathering resistance have been developed. In particular, organic resins such as silicone resins, fluororesins, modified acrylic resins or the like are deteriorated with difficulty by sunlight, acid rain, etc., and therefore suited to be used as a base resin of outdoor paintings. However, coating films containing these resins as the base resin are insufficient in hardness; therefore they have drawbacks that their surfaces are liable to be damaged due to dust, sand particles or staining materials suspending in the air, or a staining material adheres to the surfaces due to static charge, or are deteriorated by acid rain or the like which has recently become a problem, with the result that the protection performance is reduced or the appearance or beauties are damaged with elapse of time.

As a material capable of forming a coating film with a high hardness, a silicone hard coating material is known which contains as a major ingredient the hydrolyzate of an alkyltrialkoxysilane (T unit source) and/or a tetraalkoxysilane (Q unit source). This material enhances crosslink density to make the hardness higher; on the other hand, it has poor flexibility and therefore clacks are liable to be produced with elapse of time. Thus, it has the drawback that satisfactory weathering resistance can not be obtained.

Methods of introducing a silicone resin into organic resins for the purpose of obtaining good weathering resistance, have been studied, and silicone-modified acrylic resins, silicone-modified polyester resins, silicone modified epoxy resins are already known. Decomposition of these silicone-modified resins due to sunlight is quite suppressed thanks to the silicone resin incorporated. However, they have drawbacks that crosslink density is still insufficient and therefore the surface hardness is also insufficient, that adhesion is insufficient, that they are stained by effect of static charge so that good appearance can be maintained with difficulty.

To prevent adhesion of staining materials suspending in the air by reducing the surface specific resistance of the coating film, it is attempted to add to coating materials, ionic surface active agents or static agents, or an alkylsilicate which is a precursor of silanol groups producing hydrophilic nature. According to this method, although it is possible to temporally prevent adsorption of staining materials effectively, such coating films are basically poor in water-resistance and therefore are readily washed away by rain water, so that the effect cannot be maintained. Accordingly, they are not suitable for outdoor use.

For the purpose of making the action of preventing adhered staining materials from remaining permanently, an organic painting material composition having good resistance to acid rain is proposed, which is prepared by adding to a painting material a condensation product of an alkylsilicate oligomer and a silane coupling agent, particularly a hydrolyzate of an epoxy-functional silane (Japanese Laid-open Patent Publication (kokai) No. 6-306328). A coating composition having good stain resistance has also been proposed, which is prepared by adding the same material to a fluororesin system (Japanese laid-Open Patent Publication (kokai) No. 7-82520). While this system provides stain resistance which is good to some extent, it contains a large number of Q units derived from tetrafunctional alkylsilicate oligomers as structural units, for improvement of hydrophilic nature. For this, there is the drawback that as hydrolysis and condensation proceed gradually with elapse of time, crosslink density will be raised due to the a large number of Q units, thereby stresses are partly produced and as a result microcracks are formed to damage appearance, and that since the silanol groups derived from Q units are enriched with reaction activity, they condense themselves with elapse of time, so that the hydrophilic nature tends to be decreased gradually. Furthermore, there is the drawback that preparation is performed according to the method, a mixture of the alkylsilicate oligomer, the silane coupling agent oligomer and block polymers of both is formed. That is, the epoxy groups are not introduced uniformly into the alkylsilicate, so that a quite amount of the alkylsilicate oligomer which is readily dissolved remains, and consequently especially water-resistance and alkali-resistance are reduced.

SUMMARY OF THE INVENTION

Accordingly, a object of the present invention is to provide a coating composition satisfying the requirements for coating materials used to protect the surfaces which are exposed outdoors directly or to maintain the appearance and beauties of the surfaces.

The present inventors studied thoroughly to achieve the object to find that the object can be solved by adding an oligomeric silicone compound having a particular functional group and a hydrolyzable group together in the molecule to a base ingredient of an organic resin.

According to the present invention, there is provided a coating material composition comprising:

(A) an organic resin, and
(B) a silicone compound represented by the average composition formula (1):

$$(X)_a(Y')_b(R^1)_c SiO_{(4-a-b-c)/2} \qquad (1)$$

wherein X is an organic group containing at least one functional group selected from the group consisting of an epoxy group, a mercapto group, an acryloyl group, a methacryloyl group, an alkenyl group, a haloalkyl group and an amino group, Y' is a hydrolyzable group or an admixture of a hydrolyzable group and the silanol group, said silanol group amounting to 20 mole % or less of the Y', $R^1$ is a monovalent hydrocarbon group, a is a number of 0.05 to 0.90, b is a number of 0.12 to 1.88, and c is a number of 0.10 to 1.00, a+b+c being in the range of 2.02 to 2.67, containing silicon atoms to which said functional group-containing organic group X is bonded in an amount of 5 to 90 mol % based on the entire silicon atoms in the molecule, containing the T unit represented by $R^1$—$SiO_{3/2}$ in an amount of 10 to 95 mole % based on the entire siloxane units in the molecule, and having an average polymerization degree of 3 to 100.

Even if the cured film obtained from the coating composition according to the present invention is exposed outdoors, (a) the film has a high surface hardness and is enriched with lubricating nature, thus having good scuffing resistance, (b) the film has a structure enriched with flexibility as a whole and therefore exhibits good weathering resistance, so that cracks or the like are not produced outdoors where temperature varies extremely, (c) the film has a great number of polar groups exhibiting hydrophilic nature potentially which function to eliminate static charge that may be accumulated on the surfaces, thereby suppressing the adhesion of staining materials, (d) the film has such a function that staining materials adhered to the surfaces or acid rain is washed away readily due to the hydrophilic nature provided by the polar groups, (e) the film maintains stable stain resistance and chemical resistance because the polar groups hardly change with elapse of time and are hardly lost from the surfaces, and (f) the film adheres strongly to a variety of substrates and has good water resistance by the action of organic functional groups. Furthermore, dissolution or hydrolysis of the film is suppressed against boiling water, acidic solutions, alkaline solutions, etc. Thus, the coating film has durable properties such as stain resistance, boiling water resistance, chemical resistance, etc.

(A) Organic Resin

The organic resin which can be used in the present invention, may be any organic resin which is used in known coating materials of non-crosslinkable type and crosslinkable type which have been heretofore used favorably for outdoor use.

Non-crosslinkable coating material forms a film by simple evaporation of the solvent in which the resin is dissolved. Organic resins used for such coating materials include for example acrylic polymers, vinyl polymers, and fluoropolymers.

Crosslinkable coating materials are crosslinkable at normal temperature or by heating to form cured coating films. With an organic resin used for the coating materials of this type, is optionally used a crosslinking agent and further a catalyst in combination as necessary depending on the system of crosslinking. The organic resin may be required to have a particular functional group depending on the system or mechanisim of crosslinking. It is well known to those skilled in the art what kind of a crosslinking agent, catalyst or functional group is required for a particular crosslinking system. Specifically, examples of such crosslinkable organic resin-based systems include oxidation-curable alkyd resin system, melamine-crosslinkable or isocyanate-crosslinkable polyester, acrylic and fluororesin systems, epoxy-crosslinkable epoxy resin system; epoxy group-containing modified acrylic resin system, moisture-curable silicone-modified acrylic system (i.e., a resin system containing as the base resin an acrylic copolymer having alkoxysilyl group in its side chains), and moisture-curable silicone resin system, addition reaction-curable (i.e., hydrosilylation-crosslinkable) silicone resin system, free radical-crosslinkable silicone resin system, UV-curable silicone resin system, and so on.

Among the resin systems above, are preferably used moisture-curable, addition-reaction curable, free radical-crosslinkable and UV curable silicone resin systems; melamine-crosslinkable, isocyanate-curable, acid/epoxy-curable and alkoxysilyl-crosslinkable acrylic resin systems; and fluororesins. In particular, in the case of the moisture-curable silicone resin system, the organic substituents of the silicone resin used therein are preferably the methyl group and/or the phenyl group. In th case of the addition reaction-curable or UV curable silicone resin systems, it is preferred that the component (B) has no alkenyl groups, acryloyl group or methacryloyl group in the group X.

(B) Silicone Compound

In the silicone compound (B), preferably, the amount of the silicon atoms having the functional group-containing organic group X thereon accounts for 5 to 90 mole % of the entire silicon atoms in the molecule, and the amount of T unit represented by R—$SiO_{3/2}$ accounts for 10 to 95 mol % of the entire siloxane units. If the amount of the silicon atoms having the organic group X bonded thereto is less than 5 mol % of the entire silicon atoms, ability of fixing the silicone compound (B) in the coating film is sufficient, so that the silicone compound (B) is undesirably liable to be dissolved out of the coating film. If the amount is over 90 mol %, hydrophilic nature of the silicone compound (B) is insufficient and therefore undesirably good stain resistance can not be obtained. The especially preferred amount ranges from 10 to 80 mol %. Furthermore, if the amount of the T unit represented by R—$SiO_{3/2}$ is less than 10 mol % of the entire siloxane units, flexibility and hydrophilic nature imparted to the coating film are insufficient, so that undesirably cracks are liable to occur and good stain resistance can not be obtained. On the other hand, if the amount is more than 95 mol %, hydrophobic nature is imparted too much and hydrophilic nature is insufficient, while sufficient flexibility is obtained, so that good stain resistance can not be obtained. More preferably, the amount of the T unit ranges from 20 to 90 mol %.

It is noted that the oxygen atom constituting the T unit represented by R—$SiO_{3/2}$ includes not only the oxygen atoms constituting siloxane linkage but also the oxygen atoms of Si-bonded hydroxyl group and those of the organic groups which are bonded to silicon atoms at their terminal oxygen atoms such as, for example, alkoxyl groups, isopropenyloxy group and acetoxy group.

The silicone compound (B) preferably has a polymerization degree of 3 to 100. If the polymerization degree is less than 3, undesirably, the compound may be volatile or impossible to impart sufficient hydrophilic nature to the coating surface, or readily be dissolved out of the film. If the polymerization degree is more than 100, the compound (B) is not dispersed well in the coating film formed; thus uniform films can be formed with difficulty. Preferably, the polymerization degree is in the range of 5 to 80.

The functional group-containing organic group represented by X acts to prevent the silicone compound (B) from being lost from the coating film and to enhance adhesion of the coating film layer to the substrate by reaction with the organic resin (A) or the substrate to form chemical bonding, formation of hydrogen bonding due to its polar structure, or interaction based on affinity. Any groups which act in this way can be used, and any organic groups known as organic substituents of so-called silane coupling agents can be used. The functional group reacts with the organic resin (A) or increases dissolution of the silicone compound (B) into the organic resin (A), thereby acting to make the silicone compound (B) remain in the coating layer effectively. Therefore, the functional group is desirably selected according to the kind of the organic resin (A) used in combination. The functional group also acts to improve adhesion of the coating layer to the substrate.

The functional group-containing organic group is preferably a $C_1$ to $C_{10}$ hydrocarbon group having such a functional group. Examples of the functional group-containing organic group includes, for example, the following.

γ-glycidoxypropyl group, β-(3,4-epoxycyclohexyl)ethyl group, 5,6-epoxyhexyl group, 9,10-epoxydecyl group, γ-mercaptopropyl group, β-(mercaptomethylphenyl)ethyl group, 6-mercaptohexyl group, 10-mercaptodecyl group, mercaptomethyl group, γ-methacryloyloxypropyl group, γ-acryloyloxypropyl group, γ-methacryloyloxymethyl group, γ-acryloyloxymethyl group, vinyl group, 5-hexenyl group, 9-decenyl group, p-styryl group, γ-chloropropyl group, γ-bromopropyl group, trifluoropropyl group, perfluorooctylethyl group, γ-aminopropyl group, γ-(2-aminoethyl) aminopropyl group, p-aminomethylphenylethyl group, etc.

These organic functional group-containing substituents may be contained singly or in combination of plural kinds thereof in the silicone compound (B).

In the general formula (1), Y' stands for a hydrolyzable group or an admixture of a hydrolyzable group and a silanol group. The hydrolyzable group includes, for example, those described in respect of the general formulas (2) and (3) described below.

Furthermore, in the general formula (1), $R^1$ represents a monovalent hydrocarbon group, specifically ones having 1 to 10 carbon atoms, and more specifically includes, for example, methyl, ethyl, propyl, hexyl, cyclohexyl, phenyl, decyl and the like.

The silicone compound represented by the general formula (1) is obtained, for example, by subjecting a silane coupling agent represented by the general formula (2):

$$Si(X)_d(Y)_e(R^1)_f \qquad (2)$$

wherein X and $R^1$ are as defined above, Y is a hydrolyzable group, d is an integer of 1 or 2, e is an integer of 2 or 3, and f is an integer of 0 or 1, provide d+e+f=4, and an alkoxysilane mixture containing a trifunctional hydrolyzable silane represented by the general formula:

$$Si(Y)_3(R^1) \qquad (3)$$

wherein Y and $R^1$ are as defined above, to partial co-hydrolysis and condensation.

As the silane coupling agent represented by the general formula (2), can be used either of silane coupling agents having two hydrolyzable groups X (D unit source) capable of forming siloxane linkage through hydrolysis and condensation and ones having three hydrolyzable groups X (T unit source).

The hydrolyzable groups (Y) in the trifunctional hydrolyzable silane represented by the general formula (3) undergo partial hydrolysis and condensation, thus a part thereof forming silanol groups finally and another part forming siloxane linkages. Furthermore, the other part of the hydrolyzable groups remain as they are in the silicone compound (B).

The trifunctional hydrolyzable silane is the source of a so-called T unit, and is presumably to have the action of giving hardness to a coating film obtained from the composition, the action of flexibility and pliability which is conflict with the hardness, the action of imparting hydrophilic nature to the silicone compound (B) and the coating film to a proper extent by the effect of the silanol groups produced, the action eliminating static charge, and, in the case the remaining substituents are alkyl groups, the action of imparting lubricating properties to the coating film surface. In particular, in regard to static eliminating properties, the silanol groups derived from T unit sources have a low polarity and therefore have a low condensation activity unlike the silanol groups derived from Q unit sources and can maintain hydrophilic nature and static eliminating properties which are stable with elapse of time.

In the general formulas (2) and (3), the monovalent hydrocarbon group $R^1$ preferably has 1 to 10 carbon atoms, specifically methyl, ethyl and propyl groups. Out of them, the methyl group is particularly preferred since it has the lowest hydrophobic nature and is enriched with lubricating properties.

In the general formulas (2) and (3), as the hydrolyzable group Y, conventionally known hydrolyzable groups can be used and include the examples below.

Methoxy group, ethoxy group, butoxy group, isopropoxy group, acetoxy group, butanoxime group, amino group, etc. The hydrolyzable groups may be used singly or in combination of plural kinds thereof. The methoxy group and the ethoxy group are particularly preferred since the use thereof results in good shelf stability of the coating material, and further good stain resistance can be obtained at an early stage because of its proper hydrolyzability.

In the synthesis reaction above, together with the trifunctional hydrolyzable silane of the general formula (3), difunctional dialkyldialkoxysilane (D unit source) or tetrafunctional tetraalkoxysilane (Q unit source) may be optionally used. Incidentally, since the Q unit has a fear of generating stress or the like in the film, when the Q source is added to the coating material composition, the amount thereof is required to be determined carefully. The amount of the Q unit source should be limited to 30 parts by weight or less per 100 parts by weight of the T unit source. Since the D unit markedly improves the flexibility of the film but on the other hand lowers hydrophilic nature seriously, it should be added carefully. The amount of the D unit source should be limited to 30 parts by weight or less per 100 parts by weight of the T unit source.

The partial hydrolysis and condensation of the silane coupling agent of the general formula (2), the trifunctional hydrolyzable silane of the general formula (3) and, optionally, other hydrolyzable silanes can be carried out by a variety of methods known heretofore. Specifically, the methods include those exemplified below but are not limited thereto.

(a) A method in which a silane mixture containing given amounts of the silane coupling agent and the trifunctional silane (T unit source) is subjected to partial co-hydrolysis and condensation in the presence of a hydrolysis-condensation catalyst.

(b) A method in which a silane mixture containing a given amount of trifunctional hydrolyzable silane (T unit source) is partially hydrolyzed, and the resulting oligomers or a resin is reacted with a given amount of the silane coupling agent.

(c) A method in which a mixture containing a given amount of the silane coupling agent is co-hydrolyzed, and the resulting hydrolyzate is reacted with the trifunctional hydrolyzable silane (T unit source) or a hydrolyzate thereof produced by previously hydrolyzing the same.

Out of the methods, particularly preferred is the method (a), because it is possible to introduce the functional group-containing organic group, hydrolyzable group and the T unit into the resulting silicone compound (B) uniformly, thus achieving both of improvement in flexibility of the film and resistances, e.g. stain resistance and chemical resistance such as resistance to acid rain and prevention of cracks from occurring in the film.

Silane coupling agents which are heretofore known can be used as the silane coupling agent of the general formula (2) and include, for example, vinyltrimethoxysilane, γ-glycidoxypropyltrimethoxysilane, γ-glycidoxypropylmethyldiethoxysilane, β-(3,4-epoxycyclohexyl)ethyltrimethoxysilane, γ-mercaptopropyltrimethoxysilane, γ-methacryloyloxypropyltrimethoxysilane, γ-acryloyloxypropyltrimethoxysilane, γ-aminopropyltriethoxysilane, 5-hexenyltrimethoxysilane, p-styryltrimethoxysilane, trifluoropropyltrimethoxysilane, γ-glycidoxypropyltriethoxysilane, γ-glycidoxypropylmethyldiisopropenyloxysilane and the like.

The trifunctional hydrolyzable silane of the general formula (3) includes, for example, methyltrimethoxysilane, methyltriethoxysilane, methyltriisopopoxysilane, methyltributoxysilane, ethyltrimethoxysilane, propyltrimethoxysilane, hexyltrimethoxysilane, phenyltrimethoxysilane, decyltrimethoxysilane, methyltriacetoxysilane, methyltributanoxysilane, methyltriisopropenyloxysilane and the like.

The difunctional hydrolyzable silane and tetrafunctional hydrolyzable silane, which are optionally used, include for example dimethyldimethoxysilane, dimethyldiethoxysilane, dimethyldibutoxysilane, methylphenyldimethoxysilane, diphenyldimethoxysilane, tetramethoxysilane, tetraethoxysilane, tetrabutoxysilane and the like.

As the hydrolysis-condensation catalyst used for carrying out the hydrolysis and condensation reaction, a variety of hydrolysis-condensation catalysts known heretofore can be used. Specific examples include organic acids such as acetic acid, butyric acid, maleic acid and citric acid, inorganic acids such as hydrochloric acid, nitric acid, phosphoric acid, and sulfuric acid, basic compounds such as triethylamine, organometallic salts such as tetrabutyl titanate and dibutyltin dilaurate, and fluorine-containing compounds such as KF, $NH_4K$ and the like. The catalysts may be used singly or in combination of plural kinds thereof. The amount of the catalyst is preferably in the range of 0.0001 to 1 mol % based on the entire reactants.

For performing the hydrolysis and condensation reaction, a solvent may be optionally used as necessary. Solvents which can be used include, for example, alcohols such as methanol, ethanol, isopropanol, t-butanol and the like, ketones such as acetone, methyl isobutyl ketone and the like, ethers such as dibutyl ether and the like, esters such as ethyl acetate and the like, and aromatics such as toluene. Particularly preferred are the solvents like methanol, ethanol and acetone.

The amount of water used for the partial co-hydrolysis and condensation reaction is determined according to the desired degree of polymerization. Since addition of water in excess destroys hydrolyzable groups, leading finally to gelation, the amount of the water must be determined strictly. Particularly, use of a fluorine-containing compound is preferred, because it is capable of proceeding the hydrolysis and condensation completely and therefore it is possible to determine the polymerization degree by selecting the amount of water and to set the molecular weight as desired. Specifically, when a product with an average polymerization degree M is aimed to be produced, (M−1) moles of water is used per M moles of a hydrolyzable silane compound. When other catalysts are used, it is necessary to increase water slightly as compared to this case.

The hydrolysis and condensation reaction are preferably carried out in the range of from room temperature, to 150° C. At a temperature lower than room temperature reaction proceeds unpractically slowly, and at a temperature higher than 150° C., organic groups such as epoxy and mercapto groups may undesirably decompose thermally.

The amount of the silicone compound (B) formulated in the composition ranges preferably from 0.1 to 50 parts by weight, more preferably from 1.0 to 20 parts by weight, per 100 parts by weight of resinous solid components contained in the composition. If the amount of the silicone compound (B) is too small, scuffing resistance, stain resistance, weathering resistance, chemical resistance and water resistance of the film obtained are insufficient. On the other hand, if the amount is more than 50 parts by weight, the film is so hard that water resistance, weathering resistance and flexibility of the film are lowered.

Other Ingredients

The composition of the present invention normally contains an organic solvent in addition to the components (A) and (B) above. Any organic solvent can be used without limitation as long as the organic resin (A) is dissolved or dispersed therein and the solvent substantially does not react with the silicone compound (B). Specifically, examples include acetate esters (e.g., ethyl acetate, propyl acetate and the like), ketones (e.g., methyl isobutyl ketone and the like), aromatic hydrocarbons (e.g., xylene, toluene and the like), aliphatic hydrocarbons (e.g., heptane and the like), alcohols (e.g., propyl alcohol and the like), and ethers (e.g., ethyl cellosolve, butyl cellosolve and the like). The solvents can be used singly or in combination of plural kinds thereof.

To the composition can be added optionally, for example, a coloring agent, a filler, a curing catalyst, an anti-sag agent, an anti-cissing agent, a UV light absorber, and a UV light stabilizer.

Coating Operation

Substrates to which the coating material composition of the present invention can be applied are not particularly limited, and include, for example, inorganic substrates such as slates and concrete, metallic substrates such as steels, aluminum, zinc, stainless steel, and materials produced by surface-treating these with chromic acid, zinc phosphate, and so on, and plastic substrates such as polyvinyl chloride, polyethylene telephthalate and polyethylene. Furthermore, products by applying a known primer, an intercoating material, a facing material etc. to the substrates above can be used as substrates.

The application can be performed by brushing, spraying, roller coating, and dipping, for instance. The coating weight is generally in the range of 1 to 100 μm, preferably 10 to 60 μm.

Actions

Heretofore alkylsilane compounds and the hydrolysis-condensation products (resin) thereof are known as materials having water-repellency or capable of imparting water-repellency. The inventors of the present invention have found that hydrolysis of the trifunctional hydrolyzable alkylsilane under proper reaction conditions described above can selectively produce a linear oligomer having alkoxyl groups pendent from side chains thereof, and that the compound in which the organic functional groups have been introduced at parts of the side chains, exhibits unexpectedly hydrophilic nature. Although the alkoxyl groups present at the side chains are converted into silanol groups because of its hydrolyzability, the hydrolyzable activity is low and capability of condensation is low, and therefore it is presumed that a considerable amount of the silanol groups remain as they are and exhibit good and stable hydrophilic nature and anti-static function. Moreover, since the silicone compound thus obtained is enriched with linear structures, if crosslinking proceeds to some extent to increase hardness of a coating film, the film is enriched with flexibility; thus, the coating film has unique characteristics that cracks do not occur, that the film has good scuffing resistance, that stain adheres to the film with difficulty and adhered stain is readily eliminated therefrom, and further that it has hydrophilic nature.

The silanol groups possessed by Q unit derived from tetraalkoxylsilanes have strong polarity and are enriched with reaction activity; thus crosslink density will increase with elapse of time, resulting in that cracks occur to damage appearance and that hydrophilic nature is lowered with elapse of time. In contrast, the silanol groups possessed by T units used in the present invention have low reaction activity and therefore remain on the surface of the coating film stably after the completion of the curing reaction; thus durable hydrophilic nature and stain resistance can be obtained. Furthermore, unlike the Q units, T units impart flexibility to the cured film as described above. Accordingly, both of maintenance of a high hardness and flexibility can be achieved. Although a large amount of Q units are contained, hydrophilic nature of the silicone compound per se is too strong, and therefore it is readily lost from the coating film. However, in the system of the present invention in which T units are mainly contained suitable hydrophilic nature is obtained, properties tend to be maintained at their initial levels. In addition, since alkyl groups accompanying T units impart lubricating properties to the film, good scuffing resistance, weathering resistance and stain resistance can be obtained.

In the present invention, to obtain the excellent effects of the present invention, it is essential to use the silicone compound (B) satisfying the three requirements with respect to the T unit structure, the organic functional group and the hydrolyzable silyl group.

[Working Examples]

The present invention will now be described in detail with reference to working examples. In the description below, "part(s)" and "%" are based on weight.

Synthesis Example 1

A 1,000 mL reaction vessel having a thermometer, a nitrogen-feeding pipe, and a dropping funnel was charged with 118 g (0.50 mol) of γ-glycidoxypropyltrimethoxysilane, 68 g (0.50 mol) of methyltrimethoxysilane, 320 g (10 mol) of methanol and 0.06 g (0.001 mol) of KF, and then 14.1 g (0.80 mol) of water was added slowly dropwise at room temperature under stirring. After the completion of the dropwise addition, stirring was continued at room temperature for three hours, and thereafter low boiling point compounds were distilled off under reduced pressure, and the residue was filtered to give 120 g of a colorless and clear product.

The substance thus obtained was determined by GPC to find that it had an average polymerization degree of 5.2 which was approximately as set (set polymerization degree: 5).

The epoxy equivalent was determined according to the epoxy ring-opening method using hydrochloric acid to be 292 g/mol (set value: 296 g/mol). It was confirmed that epoxy groups had been introduced in an intended amount.

The amount of the alkoxy group was determined by alkaline cracking to be 28.7% by weight (calculated value: 29.2% by weight).

The results of $^1$H—MNR spectrometry showed that the obtained substance had the structure having the general formula below.

The average composition formula

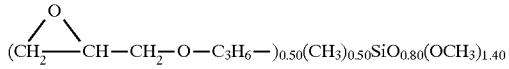

Furthermore, according to measurement using $^{29}$Si—NMR spectrometry, the status of each silicone atom was identified as below.

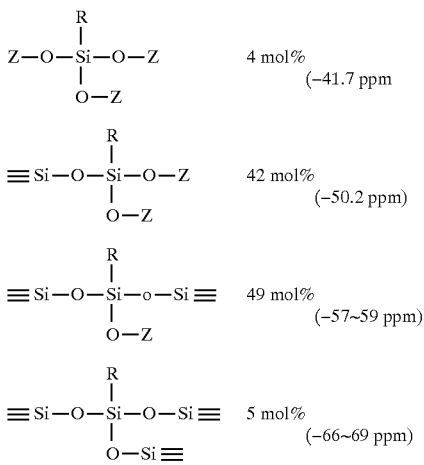

wherein R is the methyl group or the γ-glycidoxypropyl group, and Z is a hydrogen atom or the methyl group.

The analytical results show that the silicone compound is mainly comprised of linear structures. The compound thus prepared is referred to as Compound A.

Compounds B to H and Comparative Compound J having the set structures as shown in Table 1 were prepared in the same manner, except that the kind and amount of a catalyst were changed as given in the same table.

The methods were also evaluated besides the partial co-hydrolysis and condensation method.

Method II

A method in which a trialkoxysilane is first hydrolyzed, followed by reaction and condensation with a silane coupling agent.

Method III

A method in which a silane coupling agent is first hydrolyzed, followed by reaction and condensation with a trialkoxysilane.

TABLE 1

| Silicone compounds and starting compounds used for syntheses and the amounts thereof (mol) | | | | | | | | | |
|---|---|---|---|---|---|---|---|---|---|
| Silicone Compound | A | B | C | D | E | F | G | H | J |
| γ-Glycidoxypropyltrimethoxysilane | 0.50 | — | — | — | — | — | 0.50 | 0.50 | 0.50 |
| γ-Mercaptopropyltrimethoxysilane | — | 0.80 | — | — | — | — | — | — | — |
| γ-Acryloxypropyltrimethoxysilane | — | — | 0.30 | — | — | — | — | — | — |
| Vinyltriethoxysilane | — | — | — | 0.50 | — | — | — | — | — |
| γ-Glycidoxypropylmethyldimethoxysilane | — | — | 0.10 | — | — | — | — | — | — |

TABLE 1-continued

Silicone compounds and starting compounds used for syntheses and the amounts thereof (mol)

| Silicone Compound | A | B | C | D | E | F | G | H | J |
|---|---|---|---|---|---|---|---|---|---|
| Trifluoropropyltrimethoxysilane | — | — | — | — | 0.20 | — | — | — | — |
| γ-Aminopropyltrimethoxysilane | — | — | — | — | — | 0.10 | — | — | — |
| Methyltrimethoxysilane | 0.50 | 0.20 | 0.60 | — | 0.80 | 0.85 | 0.50 | 0.50 | — |
| Methyltriethoxysilane | — | — | — | 0.40 | — | — | — | — | — |
| Methyltributanoximesilane | — | — | — | — | — | 0.05 | — | — | — |
| Tetramethoxysilane | — | — | — | 0.10 | — | — | — | — | 0.50 |
| KF | 0.001 | 0.001 | — | 0.01 | 0.0001 | 0.001 | — | — | — |
| NH$_4$F | — | — | 0.001 | — | — | — | — | — | — |
| HCl | — | 0.005 | 0.005 | — | — | 0.005 | 0.005 | 0.005 | 0.005 |
| H$_2$O | 0.80 | 0.95 | 0.90 | 0.975 | 0.983 | 0.95 | 0.80 | 0.80 | 0.80 |
| Production Method | I | I | I | I | I | I | II | III | I |
| Functional group content (mol %) | 50 | 80 | 40 | 50 | 20 | 10 | 50 | 50 | 50 |
| T unit R$^1$—SiO$_{3/2}$ Content (mol %) | 50 | 20 | 60 | 40 | 80 | 90 | 50 | 50 | 0 |
| Set polymerization degree | 5 | 20 | 10 | 40 | 60 | 20 | 5 | 5 | 5 |

EXAMPLES 1 to 8 and Comparative Examples 1 to 3

According to the formulations given in Table 2, paints of Examples 1 to 8 and Comparative Examples 1 to 3 were prepared.

A silicone resin of oxime-curing type was used, in which all of the organic substituents were methyl groups, the molar ratio of D unit/T unit was 25/75, and the solid content was 25%.

As a substrate, polished steel plate with a thickness of about 0.3 mm was used.

Application of a paint was performed by air-spraying so as to form a film with a thickness of about 30 μm.

The coated substrate was left at 20° C. for 24 hours to complete curing.

The resulting coating film was tested for evaluating performance, as below. (In Example 9 and the following examples, the coating films were evaluated in the same manner.)

Hardness of coating film: Pencil hardness according to JIS K 5400.

Adhesion of coating film: Lattice pattern cutting test according to JIS K 5400.

Weathering resistance: After being exposed to irradiation using a sunshine weatherometer for 3,000 hours, a coating film is observed with naked eyes, according to JIS K 5400.

○: No change. Good.
Δ: Change in appearance (swelling, cracking, peeling, etc.) is observed.
×: Considerable change in appearance is observed. Bad.

Scuffing resistance: Appearance is evaluated with naked eyes after the surface being rubbed with #1,000 steel wool.

○: No damage is observed. Good.
Δ: About 1 to 5 scratches are observed.
×: Considerable damage is observed.

Stain resistance: Evaluated with naked eyes after the film being exposed to outdoor for a half year.

○: Traces of stain are hardly observed on the surface of a coating film. Good.
Δ: Traces of stain are somewhat observed on the surface of a coating film.
×: Considerable stain is observed on the surface of a coating film.

Water resistance: Appearance of coating is evaluated with naked eyes after a specimen plate being dipped in water for a week.

Δ: Change in appearance (swelling, peeling, etc.) is observed with naked eyes.
×: Considerable change in appearance is observed with naked eyes.

The results of testing coating film performance are given in Table 2.

TABLE 2

| | Examples | | | | | | | | Comparative Examples | | |
|---|---|---|---|---|---|---|---|---|---|---|---|
| | 1 | 2 | 3 | 4 | 5 | 6 | 7 | 8 | 1 | 2 | 3 |
| Silicone resin | 400 | 400 | 400 | 400 | 400 | 400 | 400 | 400 | 400 | 400 | 400 |
| Silicone Compound A | 1 | 10 | 25 | | | | | | | | |
| Silicone Compound B | | | | 10 | | | | | | | |
| Silicone Compound C | | | | | 10 | | | | | | |
| Silicone Compound D | | | | | | 10 | | | | | |
| Silicone Compound G | | | | | | | 10 | | | | |
| Silicone Compound H | | | | | | | | 10 | | | |

TABLE 2-continued

|  | Examples |  |  |  |  |  |  |  | Comparative Examples |  |  |
|---|---|---|---|---|---|---|---|---|---|---|---|
|  | 1 | 2 | 3 | 4 | 5 | 6 | 7 | 8 | 1 | 2 | 3 |
| Tetramethyl silicate pentamer |  |  |  |  |  |  |  |  |  | 10 |  |
| Silicone Compound J |  |  |  |  |  |  |  |  |  |  | 10 |
| Coating film hardness | 3H | 4H | 5H | 4H | 4H | 4H | 4H | 4H | 3H | 5H | 5H |
| Adhesion | 100/100 | 100/100 | 100/100 | 100/100 | 100/100 | 100/100 | 100/100 | 100/100 | 100/100 | 70/100 | 100/100 |
| Weathering resistance | ○ | ○ | ○ | ○ | ○ | ○ | ○ | ○ | ○ | X | Δ |
| Scufling resistance | ○ | ○ | ○ | ○ | ○ | ○ | ○ | ○ | Δ | Δ | Δ |
| Stain resistance | ○ | ○ | ○ | ○ | ○ | ○ | ○ | ○ | X | Δ | Δ |
| Water resistance | ○ | ○ | ○ | ○ | ○ | ○ | ○ | ○ | ○ | X | X |

EXAMPLES 9 to 16 and Comparative Examples 4 to 6

According to the formulations given in Table 3, paints of Examples 9–16 and Comparative Examples 4–6 were prepared.

As a silicone-modified acrylic resin, a mixture of a copolymer with an average polymerization degree of 6,000 and 50% of solid content produced by copolymerization of acrylic monomers containing 5 mol % of methacryloyloxypropyltrimethoxysilane and 10 mol % of glycidyl methacrylate, and a copolymer with an average polymerization degree of 4,000 and 50% of solid content containing 5 mol % of acrylic acid, was used.

As a substrate, polished mild steel plate with a thickness of 0.3 mm was used.

Application of a paint was performed by air-spraying so as to form a coating with a thickness of about 30 $\mu$m after being dried.

The coated substrate was left at 150° C. for 30 minuets to complete curing.

The results of testing coating film performance are given in Table 3.

TABLE 3

|  | Examples |  |  |  |  |  |  |  | Comparative Examples |  |  |
|---|---|---|---|---|---|---|---|---|---|---|---|
|  | 9 | 10 | 11 | 12 | 13 | 14 | 15 | 16 | 4 | 5 | 6 |
| Modified acrylic resin | 200 | 200 | 200 | 200 | 200 | 200 | 200 | 200 | 200 | 200 | 200 |
| Silicone Compound A | 1 | 10 | 25 |  |  |  |  |  |  |  |  |
| Silicone Compound B |  |  |  | 10 |  |  |  |  |  |  |  |
| Silicone Compound C |  |  |  |  | 10 |  |  |  |  |  |  |
| Silicone Compound D |  |  |  |  |  | 10 |  |  |  |  |  |
| Silicone Compound G |  |  |  |  |  |  | 10 |  |  |  |  |
| Silicone Compound H |  |  |  |  |  |  |  | 10 |  |  |  |
| Tetramethyl silicate pentamer |  |  |  |  |  |  |  |  |  | 10 |  |
| Silicone Compound J |  |  |  |  |  |  |  |  |  |  | 10 |
| Coating film hardness | 2H | 3H | 4H | 3H | 3H | 3H | 3H | 3H | 2H | 4H | 4H |
| Adhesion | 100/100 | 100/100 | 100/100 | 100/100 | 100/100 | 100/100 | 100/100 | 100/100 | 100/100 | 50/100 | 90/100 |
| Weathering resistance | ○ | ○ | ○ | ○ | ○ | ○ | ○ | ○ | ○ | X | Δ |
| Scufling resistance | ○ | ○ | ○ | ○ | ○ | ○ | ○ | ○ | X | Δ | Δ |
| Stain resistance | ○ | ○ | ○ | ○ | ○ | ○ | ○ | ○ | X | Δ | Δ |
| Water resistance | ○ | ○ | ○ | ○ | ○ | ○ | ○ | ○ | ○ | X | X |

EXAMPLES 17 to 24 and Comparative Examples 7 to 9

According to the formulations given in Table 4, paints of Examples 17–24 and Comparative Examples 7–9 were prepared.

A fluororesin comprised of a linear perfluoropolyether with an average polymerization degree of 1,800 and 50% of solid content was used, which is curable with hexamethylene diisocyanate.

As a substrate, polished mild steel plate with a thickness of 0.3 mm was used.

Application of a paint was performed by air-spraying so as to form a coating film with a thickness of about 30 μm after being dried.

The coated substrate was left at 150° C. for 30 minutes to complete curing.

The results of testing coating film performance are given in Table 4.

EXAMPLES 25–32 and Comparative Examples 10–12

According to the formulations given in Table 5, paints of Examples 25–32 and Comparative Examples 10–12 were prepared.

A silicone hard coating material with a solid content of 20% was used, in which all of the organic substituents are the methyl group, and a colloidal silica is used in combination.

A primer mainly comprised of a silicone-modified acrylic resin and a modified aminosilane compound, and containing a solid content of 10%, was applied to a substrate in advance.

As a substrate, polycarbonate plate with a thickness of 0.5 mm was used.

Application was performed by dipping so as to form a primary layer with a thickness of 3 μm and a hard coating material with a thickness of about 2 μm after being dried.

The primer was heated at 120° C. for 30 minutes and the hard coating material was heated at 120° C. for one hour, to complete curing.

The results of testing coating film performance are given in Table 5.

TABLE 4

| | Examples | | | | | | | | Comparative Examples | | |
|---|---|---|---|---|---|---|---|---|---|---|---|
| | 17 | 18 | 19 | 20 | 21 | 22 | 23 | 24 | 7 | 8 | 9 |
| Fluorosesin | 200 | 200 | 200 | 200 | 200 | 200 | 200 | 200 | 200 | 200 | 200 |
| Silicone Compound A | 1 | 10 | 25 | | | | | | | | |
| Silicone Compound B | | | | 10 | | | | | | | |
| Silicone Compound C | | | | | 10 | | | | | | |
| Silicone Compound D | | | | | | 10 | | | | | |
| Silicone Compound G | | | | | | | 10 | | | | |
| Silicone Compound H | | | | | | | | 10 | | | |
| Tetramethyl silicate pentamer | | | | | | | | | | 10 | |
| Silicone Compound J | | | | | | | | | | | 10 |
| Coating film hardness | 2H | 3H | 4H | 4H | 3H | 4H | 3H | 3H | 2H | 4H | 4H |
| Adhesion | 100/100 | 100/100 | 100/100 | 100/100 | 100/100 | 100/100 | 100/100 | 100/100 | 100/100 | 30/100 | 95/100 |
| Weathering resistance | ○ | ○ | ○ | ○ | ○ | ○ | ○ | ○ | ○ | X | Δ |
| Scufling resistance | ○ | ○ | ○ | ○ | ○ | ○ | ○ | ○ | Δ | Δ | Δ |
| Stain resistance | ○ | ○ | ○ | ○ | ○ | ○ | ○ | ○ | X | Δ | Δ |
| Water resistance | ○ | ○ | ○ | ○ | ○ | ○ | ○ | ○ | ○ | X | X |

TABLE 5

| | Examples | | | | | | | | Comparative Examples | | |
|---|---|---|---|---|---|---|---|---|---|---|---|
| | 25 | 26 | 27 | 28 | 29 | 30 | 31 | 32 | 10 | 11 | 12 |
| Silicone resin | 500 | 500 | 500 | 500 | 500 | 500 | 500 | 500 | 500 | 500 | 500 |
| Silicone Compound A | 1 | 10 | 25 | | | | | | | | |
| Silicone Compound B | | | | 10 | | | | | | | |
| Silicone Compound C | | | | | 10 | | | | | | |
| Silicone Compound D | | | | | | 10 | | | | | |
| Silicone Compound G | | | | | | | 10 | | | | |
| Silicone Compound H | | | | | | | | 10 | | | |
| Tetramethyl silicate pentamer | | | | | | | | | | 10 | |
| Silicone Compound J | | | | | | | | | | | 10 |
| Coating film hardness | 7H | 8H | 9H | 9H | 8H | 8H | 8H | 8H | 7H | 9H | 9H |
| Adhesion | 100/100 | 100/100 | 100/100 | 100/100 | 100/100 | 100/100 | 100/100 | 100/100 | 100/100 | 30/100 | 50/100 |
| Weathering resistance | ○ | ○ | ○ | ○ | ○ | ○ | ○ | ○ | Δ | X | X |
| Scufling resistance | ○ | ○ | ○ | ○ | ○ | ○ | ○ | ○ | ○ | Δ | ○ |
| Stain resistance | ○ | ○ | ○ | ○ | ○ | ○ | ○ | ○ | X | Δ | Δ |
| Water resistance | ○ | ○ | ○ | ○ | ○ | ○ | ○ | ○ | ○ | X | X |

What is claimed is:

1. A coating material composition comprising:

(A) an organic resin, and (B) a silicone compound represented by the average composition formula (1):

$$(X)_a(Y')_b(R^1)_c SiO_{(4-a-b-c)/2} \quad (1)$$

wherein X is an organic group containing at least one functional group selected from the group consisting of an epoxy group, a mercapto group, an acryloyl group, a methacryloyl group, an alkenyl group, a haloalkyl group and an amino group, Y' is a hydrolyzable group consisting of an organic group having a terminal oxygen atom, the organic group being bonded to a silicon atom at the terminal oxygen atom or an admixture of a hydrolyzable group consisting of an organic group having a terminal oxygen atom, the organic group being bonded to a silicon atom at the terminal oxygen atom and the silanol group, said silanol group amounting to 20 mole % or less of the Y', $R^1$ is a monovalent hydrocarbon group, a is a number of 0.05 to 0.90, b is a number of 0.12 to 1.88, and c is a number of 0.10 to 1.00, a+b+c being in the range of 2.02 to 2.67, containing silicon atoms to which said functional group-containing organic group X is bonded in an amount of 5 to 90 mol % based on the entire silicon atoms in the molecule, containing the T unit represented by $R^1 13 SiO_{3/2}$ in an amount of 10 to 95 mole % based on the entire siloxane units in the molecule, and having an average polymerization degree of 3 to 100, the oxygen atom of the T unit represented by $R-SiO_{3/2}$ including not only the oxygen atoms constituting siloxane linkage but also the oxygen atoms of Si-bonded hydroxyl group and those of the organic groups which are bonded to silicon atoms at their terminal oxygen atoms.

2. The composition of claim 1, wherein said silicone compound (B) is contained in an amount of 0.1 to 50 parts by weight per 100 parts by weight of the solid components in the composition.

3. The composition of claim 1, wherein the organic resin (A) is selected from the group consisting of moisture-curable, addition curable, radical-crosslinkable and UV curable silicone resins; melamine-crosslinkable, isocyanate-curable, acid/epoxy-curable acrylic resins; oxidation-curable alkyd resins; melamine-crosslinkable and isocyanate-crosslinkable polyesters; fluororesins; epoxy resins; epoxy group-containing modified acrylic resins; and moisture-curable silicone-modified acrylic resins.

4. The composition of claim 1, wherein in the silicone compound (B) the silicon atoms to which the organic group X is bonded are contained in an amount of 10–80 mol % based on the entire silicon atoms in the molecule, and the T unit represented by $R^1-SiO_{3/2}$ is contained in an amount of 20–90 mole % based on the entire siloxane units in the molecule.

5. The composition of claim 1, wherein said silicone compound (B) has a polymerization degree of 5–80.

6. The composition of claim 1, wherein in the silicone compound (B) the functional group-containing organic group X is selected from the group consisting of γ-glycidoxypropyl group, β-(3,4-epoxycyclohexyl)-ethyl group, 5,6-epoxyhexyl group, 9,10-epoxydecyl group, γ-mercaptopropyl group, β-(mercaptomethylphenyl)ethyl group, 6-mercaptohexyl group, 10-mercaptodecyl group, mercaptomethyl group, γ-methacryloyloxymethyl group, γ-acryloyloxypropyl group, γ-acryloyloxymethyl group, vinyl group, 5-hexenyl group, 9-decenyl group, p-styryl group, γ-chloropropyl group, γ-bromopropyl group, trifluoropropyl group, perfluorooctylethyl group, γ-aminopropyl group, γ-(2-aminoethyl)aminopropyl group, and p-aminomethylphenylethyl group.

7. The composition of claim 1, wherein said organic resin (A) contains a functional group which is capable of reacting with an epoxy group, a mercapto group, an acryloyl group, a methacryloyl group, an alkenyl group, a haloalkyl group, an amino group, and a hydrolyzable group.

8. The composition of claim 1, wherein said silicone compound is obtained by subjecting a silane coupling agent represented by the general formula (2):

$$Si(X)_d(Y)_e(R^1)_f \qquad (2)$$

wherein X and $R^1$ are as defined in claim 1, Y is a hydrolyzable group consisting of an organic group having a terminal oxygen atom, the organic group being bonded to a silicon atom at the terminal oxygen atom, d is an integer of 1 or 2, e is an integer of 2 or 3, and f is an integer of 0 or 1, provided that d+e+f=4, and an alkoxysilane mixture containing a trifunctional hydrolyzable silane represented by the general formula:

$$Si(Y)_3(R^1) \qquad (3)$$

wherein Y and $R^1$ are as defined in claim 1, to partial co-hydrolysis and condensation.

9. The composition of claim 8, wherein in the general formulas (2) and (3) of the silicone compound (B), the monovalent hydrocarbon group $R^1$ has 1 to 10 carbon atoms, and the hydrolyzable group Y is selected from the group consisting of the methoxy group, ethoxy group, butoxy group, isopropoxy group, acetoxy group and butanoxime group.

10. The composition of claim 9, wherein in the general formulas (2) and (3), the monovalent hydrocarbon group $R^1$ is methyl, ethyl or propyl group.

11. The composition of claim 8, wherein in the general formulas (2) and (3), the monovalent hydrocarbon group $R^1$ is the methyl group.

12. The composition of claim 8, wherein the silane coupling agent of the formula (2) is vinyltrimethoxysilane, γ-glycidoxypropyltrimethoxysilane, γ-glycidoxypropylmethyldiethoxysilane, β-(3,4-epoxycyclohexyl)ethyltrimethoxysilane, γ-mercaptopropyltrimethoxysilane, γ-methacryloyloxypropyltrimethoxysilane, γ-acryloyloxypropyltrimethoxysilane, γ-aminopropyltriethoxysilane, 5-hexenyltrimethoxysilane, p-styryltrimethoxysilane, trifluoropropyltrimethoxysilane, γ-glycidoxypropyltriethoxysilane, or γ-glycidoxypropylmethyldiisopropenyloxysilane.

13. The composition of claim 8, wherein the trifunctional hydrolyzable silane of the general formula (3) is methyltrimethoxysilane, methyltriethoxysilane, methyltriisopopoxysilane, methyltributoxysilane, ethyltrimethoxysilane, propyltrimethoxysilane, hexyltrimethoxysilane, phenyltrimethoxysilane, decyltrimethoxysilane, methyltriacetoxysilane, methyltributanoxysilane, or methyltriisopropenyloxysilane.

* * * * *